United States Patent
Ichikawa et al.

(10) Patent No.: US 11,569,672 B2
(45) Date of Patent: Jan. 31, 2023

(54) ELECTRONIC DEVICE AND CONTROL METHOD

(71) Applicant: CANON KABUSHIKI KAISHA, Tokyo (JP)

(72) Inventors: Sho Ichikawa, Kanagawa (JP); Kento Inai, Kanagawa (JP); Hiroshi Moritomo, Tokyo (JP); Kenichirou Hayashi, Aichi (JP); Shigeo Aoyagi, Kanagawa (JP); Sayaka Kumon, Tokyo (JP); Hirokazu Izuoka, Kanagawa (JP); Akira Matsuo, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/241,642

(22) Filed: Apr. 27, 2021

(65) Prior Publication Data
US 2021/0344210 A1 Nov. 4, 2021

(30) Foreign Application Priority Data
Apr. 30, 2020 (JP) ............................. JP2020-080692

(51) Int. Cl.
*H02J 7/00* (2006.01)
*H04N 5/232* (2006.01)

(52) U.S. Cl.
CPC .......... *H02J 7/0068* (2013.01); *H02J 7/0013* (2013.01); *H02J 7/0048* (2020.01); *H04N 5/23241* (2013.01); *H04N 5/232939* (2018.08)

(58) Field of Classification Search
CPC ...... H02J 7/0013; H02J 7/0048; H02J 7/0068; H04N 5/23241; H04N 5/232939
USPC ........................................................... 307/19
See application file for complete search history.

(56) References Cited

U.S. PATENT DOCUMENTS

| | | | | |
|---|---|---|---|---|
| 2017/0126055 | A1* | 5/2017 | Tsai | H02J 7/0063 |
| 2020/0106291 | A1 | 4/2020 | Inai | |
| 2020/0366113 | A1 | 11/2020 | Inai | |
| 2021/0195104 | A1 | 6/2021 | Hayashi | |

FOREIGN PATENT DOCUMENTS

| | | | |
|---|---|---|---|
| JP | 2019-087953 A | 6/2019 |
| JP | 2020-058104 A | 4/2020 |
| JP | 2020-188626 A | 11/2020 |

* cited by examiner

*Primary Examiner* — Hal Kaplan
(74) *Attorney, Agent, or Firm* — Canon U.S.A., Inc. IP Division

(57) ABSTRACT

An electronic device includes a connection unit and a control unit. The control unit enables a power supply path for supplying power from a first battery connected to an external device to the electronic device and enables a power supply path for supplying power from a second battery connected to the external device to a predetermined functional unit of the external device, in a case where the first battery or the second battery connected to the external device is not charged. The control unit disables a power supply path for supplying power from the second battery connected to the external device to the predetermined functional unit and enables a power supply path for supplying power from the electronic device to the first battery or the second battery, in a case where the first battery or the second battery connected to the external device is charged.

17 Claims, 16 Drawing Sheets

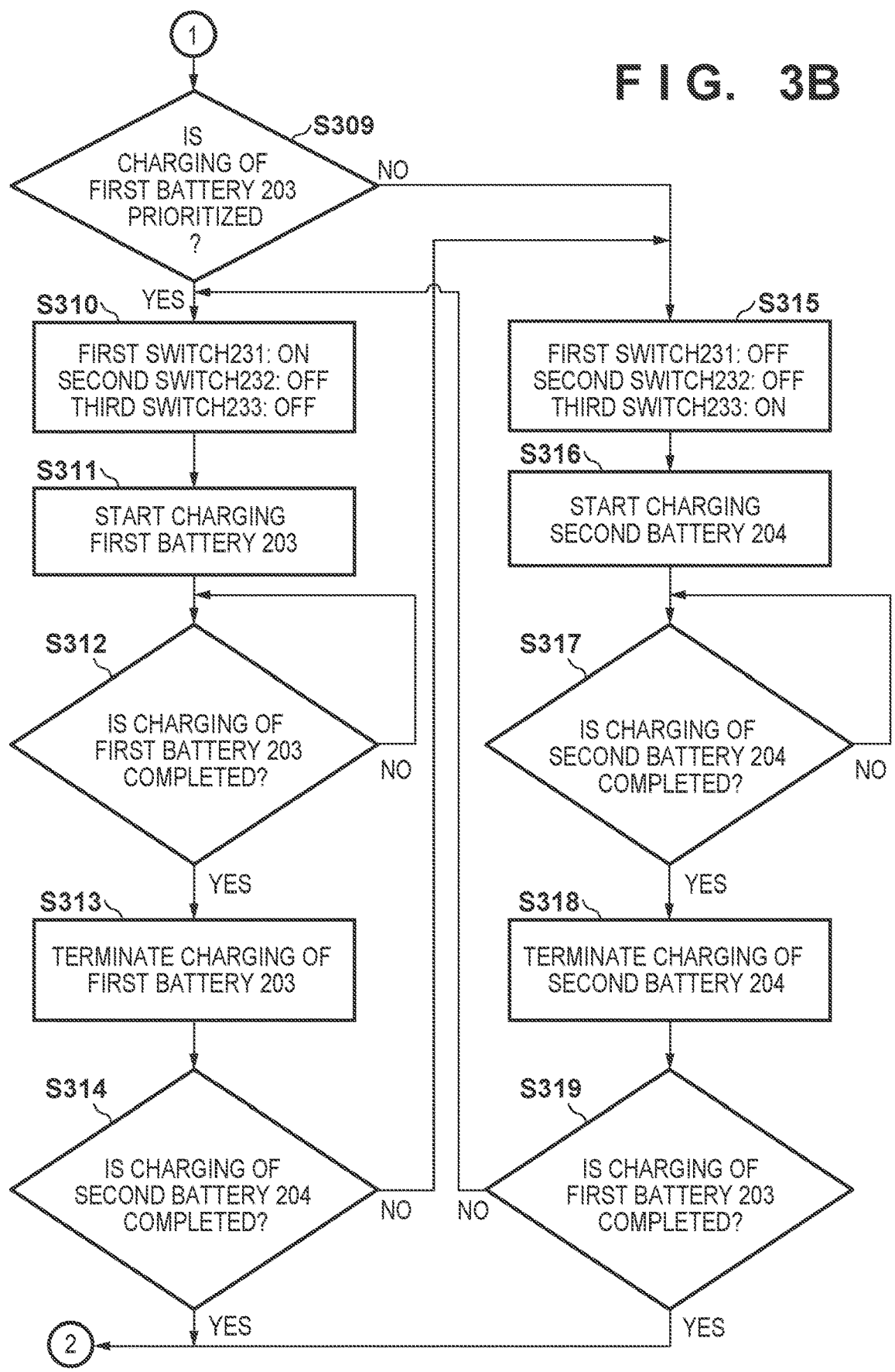

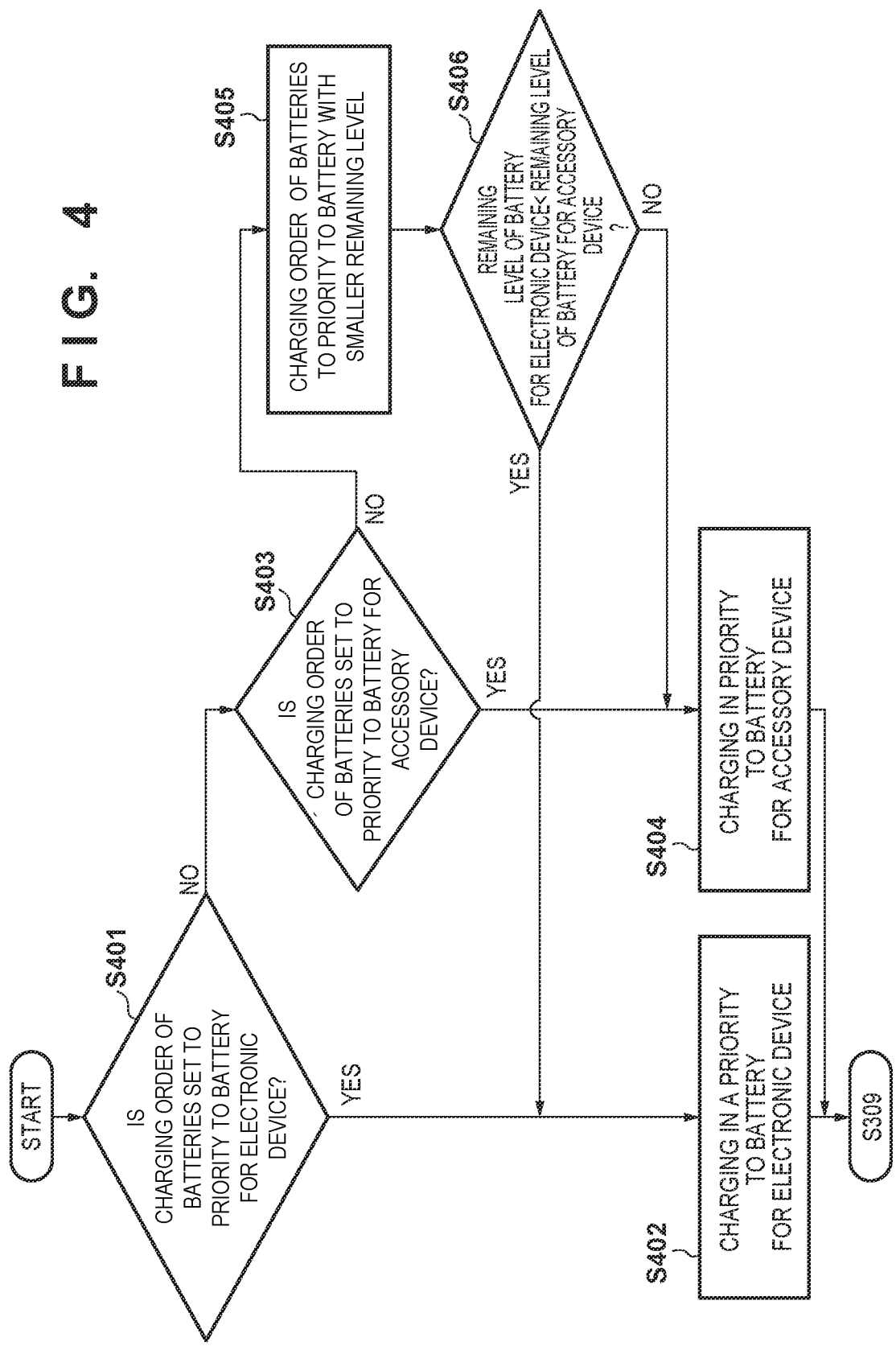

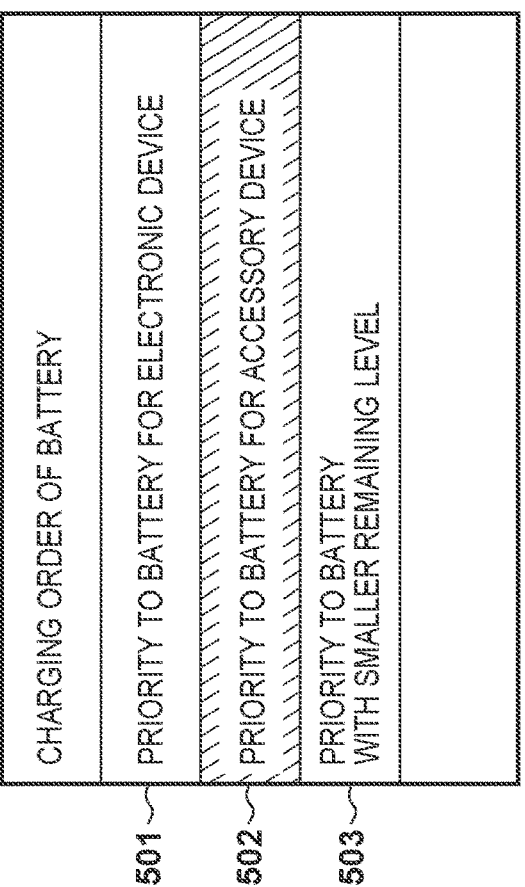
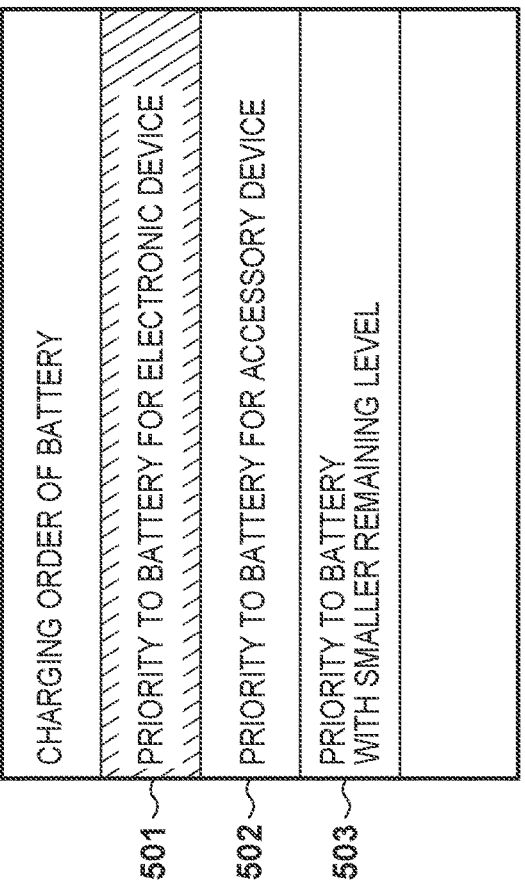
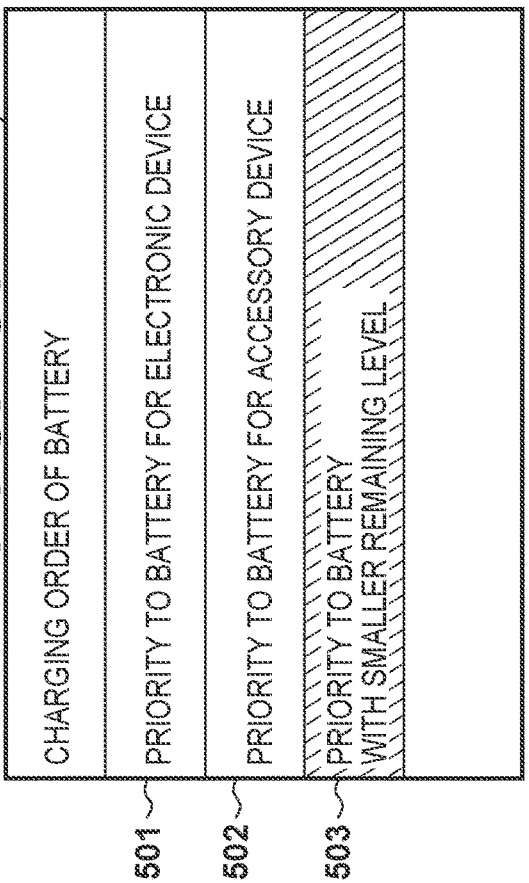

ELECTRONIC DEVICE AND CONTROL METHOD

BACKGROUND

Field of the Description

Aspects of the disclosure generally relate to an electronic device capable of controlling charging and/or discharging of batteries connected to another electronic device, and a method of controlling such an electronic device.

Description of the Related Art

Recently, a rechargeable battery such as a lithium-ion battery as a power source of an electronic device such as a digital camera, a personal computer (PC), or a smartphone is used. These electronic devices can charge the battery using power supplied from a commercial AC power source or an external device in a state where the battery is connected. In addition, in the USB (Universal Serial Bus) standard, which is one of interface standards for connecting electronic devices, power can be supplied, and batteries connected to the electronic devices can be charged.

There is an accessory device that can be mounted on an electronic device such as a digital camera capable of charging the battery by the USB standard. The accessory device includes, for example, a battery grip which can be connected to batteries and functions as a grip for cameras at the time of shooting, and a WFT (Wireless File Transmitter) having a function of communicating with an external device. In Japanese Patent Laid-open No. 2019-87953, as a control method of charging batteries connected to the accessory device, a method of switching power supply paths to the battery depending on whether the battery is in a discharge state or a charge state is disclosed.

However, in Japanese Patent Laid-open No. 2019-87953, batteries of the accessory device are not charged by a digital camera or the like to which the accessory device is connected. Furthermore, in Japanese Patent Laid-open No. 2019-87953, when the batteries of the accessory device are attempted to be charged by the digital camera, it is necessary to provide a power supply path for each battery, and the number of connection terminals or the number of charging control circuits for connecting to the accessory device increases by the number of batteries.

SUMMARY

According to an aspect of the embodiments, there is provided an electronic device that includes a connection unit; and a control unit that (a) enables a power supply path for supplying power from a first battery connected to an external device to the electronic device and enables a power supply path for supplying power from a second battery connected to the external device to a predetermined functional unit of the external device, in a case where the first battery or the second battery connected to the external device is not charged, and (b) disables a power supply path for supplying power from the second battery connected to the external device to the predetermined functional unit and enables a power supply path for supplying power from the electronic device to the first battery or the second battery, in a case where the first battery or the second battery connected to the external device is charged.

According to another aspect of the embodiments, there is provided a method that includes enabling a power supply path for supplying power from a first battery connected to an external device to an electronic device and enabling a power supply path for supplying power from a second battery connected to the external device to a predetermined functional unit of the external device, in a case where the first battery or the second battery connected to the external device is not charged; and disabling a power supply path for supplying power from the second battery connected to the external device to the predetermined functional unit and enabling a power supply path for supplying power from the electronic device to the first battery or the second battery, in a case where the first battery or the second battery connected to the external device is charged.

Further aspects of the embodiments will become apparent from the following description of exemplary embodiments.

BRIEF DESCRIPTION OF THE DRAWINGS

FIGS. 3A and 3B are flowcharts illustrating an example of a process for controlling charging and/or discharging of batteries 203 and 204 connected to the accessory device 200 via the electronic device 100 according to the first embodiment.

FIG. 4 is a flowchart illustrating an example of a charging order determination process of the batteries 203 and 204 according to the first embodiment.

FIGS. 5A to 5C are diagrams illustrating examples of charging order settings of the batteries 203 and 204 according to the first embodiment.

DESCRIPTION OF THE EMBODIMENTS

Exemplary embodiments, features, and aspects of the disclosure will be described below with reference to the drawings. However, aspects of the disclosure are not limited to the following embodiments.

First Embodiment

First, with reference to FIGS. 1A to 6, the first embodiment will be described.

In the first embodiment, an example of controlling charging and/or discharging of batteries 203 and 204 connected to an accessory device 200 via an electronic device 100, will be described.

Figure 1A:
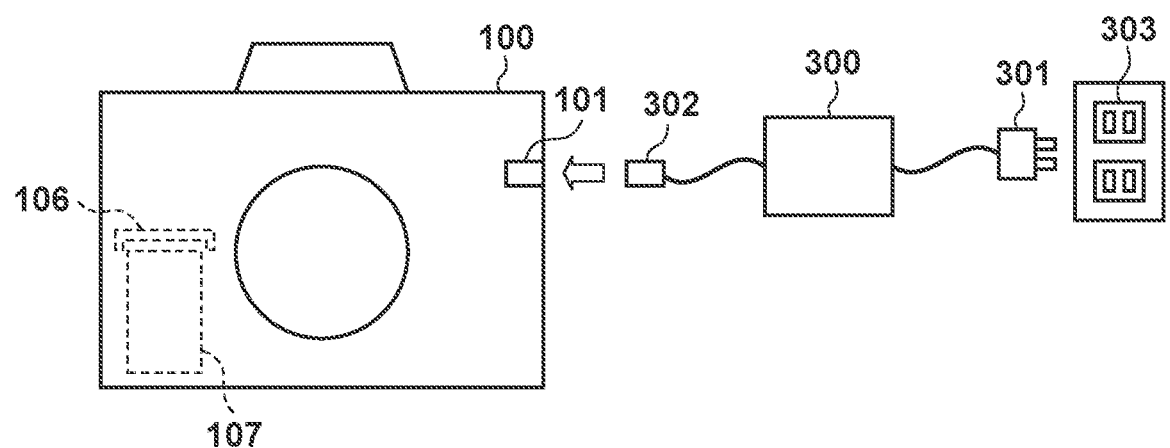
FIGS. 1A and 1B are external views of an electronic device 100 and an accessory device 200 according to a first embodiment.
Figure 1B:
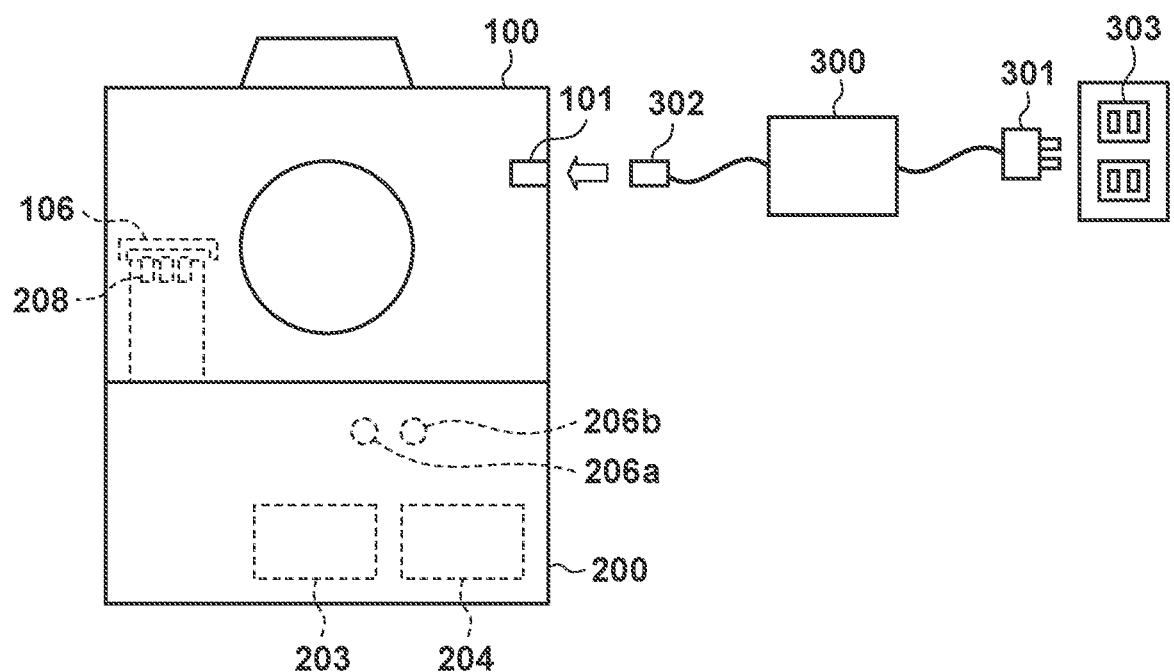

FIGS. 1A and 1B are external views of the electronic device 100 and the accessory device 200 according to the first embodiment. The electronic device 100, for example, an image capture apparatus that acts as a digital camera for capturing an image. The accessory device 200 is, for example, another electronic device that acts as a Wireless File Transmitter. The accessory device 200 is not limited to a WFT (Wireless File Transmitter), and may be a device having a function of a battery grip.

FIG. 1A is a diagram illustrating an example of a connection state between the electronic device 100 and an external device 300 when the accessory device 200 is not connected to the electronic device 100.

The electronic device 100 can connect a third battery 107 to the first battery holder 106. The third battery 107 is a rechargeable battery such as a lithium-ion battery.

The electronic device 100 has a first connector 101 (receptacle). By connecting the external device 300, it is possible to charge the third battery 107 using surplus power during power supply or power supply to the electronic device 100.

The external device 300 has a second connector 302 which is a plug-shaped USB connector, and is a power supply device for supplying power from the outside to the electronic device 100. A power plug 301 is connected to a commercial AC power source 303 in which power is converted to a DC power source by an external device 300 and power is supplied from a second connector 302. The electronic device 100 can know the voltage and current supplied to the external device 300 by voltage level and data communication of the communication line (not shown).

FIG. 1B is a diagram illustrating an example of a connection state between the electronic device 100 and the external device 300 when the accessory device 200 is connected to the electronic device 100.

The accessory device 200 can connect two batteries of the first battery 203 and the second battery 204, and the first battery 203 and the second battery 204 are rechargeable batteries such as a lithium-ion battery.

The accessory device 200 can be connected to the electronic device 100 via a connection unit 208. Power of the first battery 203, via the connection unit 208, is supplied to the electronic device 100. The power supplied from the first battery 203 to the electronic device 100 is also re-supplied to a part of the accessory device 200 via the connection unit 208. The detail will be described later with reference to FIGS. 2A to 2D. The power of the second battery 204 is supplied to a WFT circuit 234, which will be described later.

The accessory device 200 can be connected to the first battery holder 106 instead of the third battery 107. The electronic device 100 may receive power supplied from the first battery 203 of the accessory device 200 connected to the first battery holder 106. Furthermore, it is possible to receive power supplied from a second power supply circuit 112 or a power supply control unit 104 which will be described later. The detail will be described later with reference to FIGS. 2A to 2D. In order to perform charging of the first battery 203 and the second battery 204 while connecting the electronic device 100 and the accessory device 200, the external device 300 is connected to the first connector 101 in the same manner as when the accessory device 200 is not connected to the electronic device 100. A first light emitting unit 206a and a second light emitting unit 206b are light sources such as LEDs (Light Emitting Diode) for displaying a charge state by light emission.

FIGS. 2A to 2D are block diagrams illustrating examples of components of the electronic device 100 and the accessory device 200 according to the first embodiment.

Figure 2A:
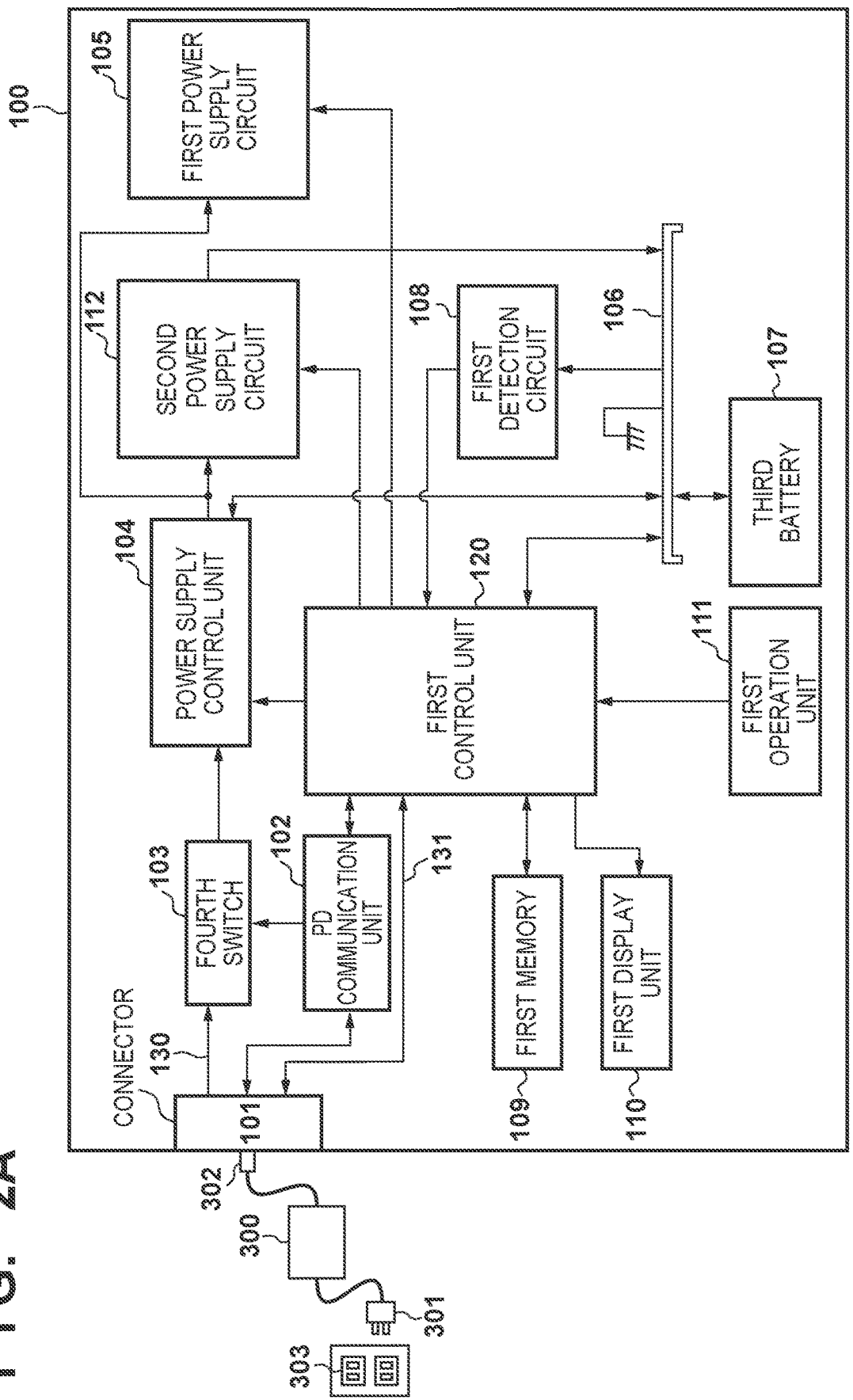
FIG. 2A is a diagram illustrating an example of components of the electronic device 100 and the accessory device 200 according to the first embodiment.

FIG. 2A is a block diagram of the electronic device 100 and the external device 300 when the accessory device 200 is not connected to the electronic device 100.

A first connector 101 is a receptacle-shaped USB connector. Via the first connector 101, a power supply 130, a signal line 131, GND (not shown) or the like is connected. The power supply 130 is a VBUS, and the signal line 131 includes a signal line required for USB communication. The power supply 130, via a fourth switch 103 and the power supply control unit 104, is connected to the third battery 107 connected to the first battery holder 106. In FIG. 2A, an AC-adapter is connected to the first connector 101 as the external device 300, but devices such as mobile batteries, PCs, smartphones, tablets, or the like may be connected to the first connector 101.

A PD communication unit 102 is a communication circuit capable of detecting a connection of the external device 300 using a CC1 terminal and a CC2 terminal (not shown) and performing communication based on the standard of USB PD (Power Delivery) with the external device 300.

The fourth switch 103 is a switch circuit for turning on and off the power supply of VBUS, and the overvoltage is controlled so as not to be applied to the circuit of the subsequent part by turning off the fourth switch 103 when the overvoltage is applied. The fourth switch 103 is controlled by a PD communication unit 102.

The power supply control unit 104 is a voltage conversion circuit for supplying power by converting the power supply 130 into a voltage available in the electronic device 100. The power supply control unit 104 includes, for example, a DC/DC converter, power required by a first power supply circuit 105 and a second power supply circuit 112 can be supplied. Furthermore, the power supply control unit 104 is switchable to supply power from at least one of power from the external device 300 and power from the third battery 107 or the first battery 203 with respect to the power supply. Furthermore, the power supply control unit 104 can charge the battery using power supplied from the external device 300. The power supply control unit 104, using power supplied from the external device 300, by controlling the voltage and the current, with respect to at least one the batteries of the third battery 107, the first battery 203, and the second battery 204, implements a quick constant current charging, a quick constant voltage charging, a linear charging, a pre-charging, or the like.

A first power supply circuit 105 is a circuit for supplying power to the system circuit of the electronic device 100 (not shown). When the charging of the third battery 107 is performed using power supplied from the external device 300, the power control circuit 104 receives power supplied from the external device 300, and performs charging with respect to the battery with surplus power while operating the system circuit by the first power supply circuit 105. Note that one of the third battery 107, the first battery 203, and the second battery 204 is charged.

The first battery holder 106 is a battery connecting portion for housing the third battery 107 to be connectable. The first battery holder 106 may also be connected to the accessory device 200 and may receive power from a battery connected to the accessory device 200. Furthermore, it is possible to supply power from the second power supply circuit 112 or the power supply control unit 104 to the accessory device 200.

A first detection circuit 108 is a circuit for detecting that the accessory device 200 is connected to the first battery holder 106. Detection signal of the first detection circuit 108 is output to a first control unit 120 which will be described later, the first control unit 120 can detect that the accessory device 200 is connected to the first battery holder 106. For example, by the terminal of the accessory device 200 side to be fitted to the first battery holder 106 of the electronic device 100 being grounded and the terminal of the electronic device 100 side being pulled up to the power supply or intermittently pulled up to the power supply, the first control unit 120 can detect the connection of the accessory device 200.

A first memory 109 includes a nonvolatile memory, a volatile memory, or the like, and is used as a storage area for storing display data of a first display unit 110 which will be described later, and also used for expanding constants, variables, computer programs, and or the like for operation of a first control unit 120 which will be described later.

The first display unit 110 includes an LCD (Liquid Crystal Display), an organic EL (Electro Luminescence), or the like, and displays an internal state of the electronic device 100, the charge state of the battery, captured images, a shooting mode, or the like. An example of the display will be described later with reference to FIG. 6.

The first operation unit 111 includes a switch, a dial, a touch panel, and/or the like that accepts a user operation such as a shooting instruction, a display of a menu screen, and a change of a shooting mode.

The second power supply circuit 112 is a circuit for generating power to be supplied to a system circuit 240 of the accessory device 200.

The first control unit 120 is a microcomputer for controlling charging or discharging of the battery, or for communicating with the accessory device 200 and the external device 300. The first control unit 120 can communicate with a device such as a PC connected to the first connector 101. Furthermore, when the external device 300 is connected to the first connector 101, the first control unit 120 receives detection signal from the PD communication unit 102, and detects that the external device 300 is connected. Furthermore, the first control unit 120 determines type and power supply capability of the connected adapter, performs control of the power supply control unit 104, and charges any one of the batteries of the third battery 107, the first battery 203 and the second battery 204. The first control unit 120 also controls the first power supply circuit 105 and the second power supply circuit 112.

Figure 2B:
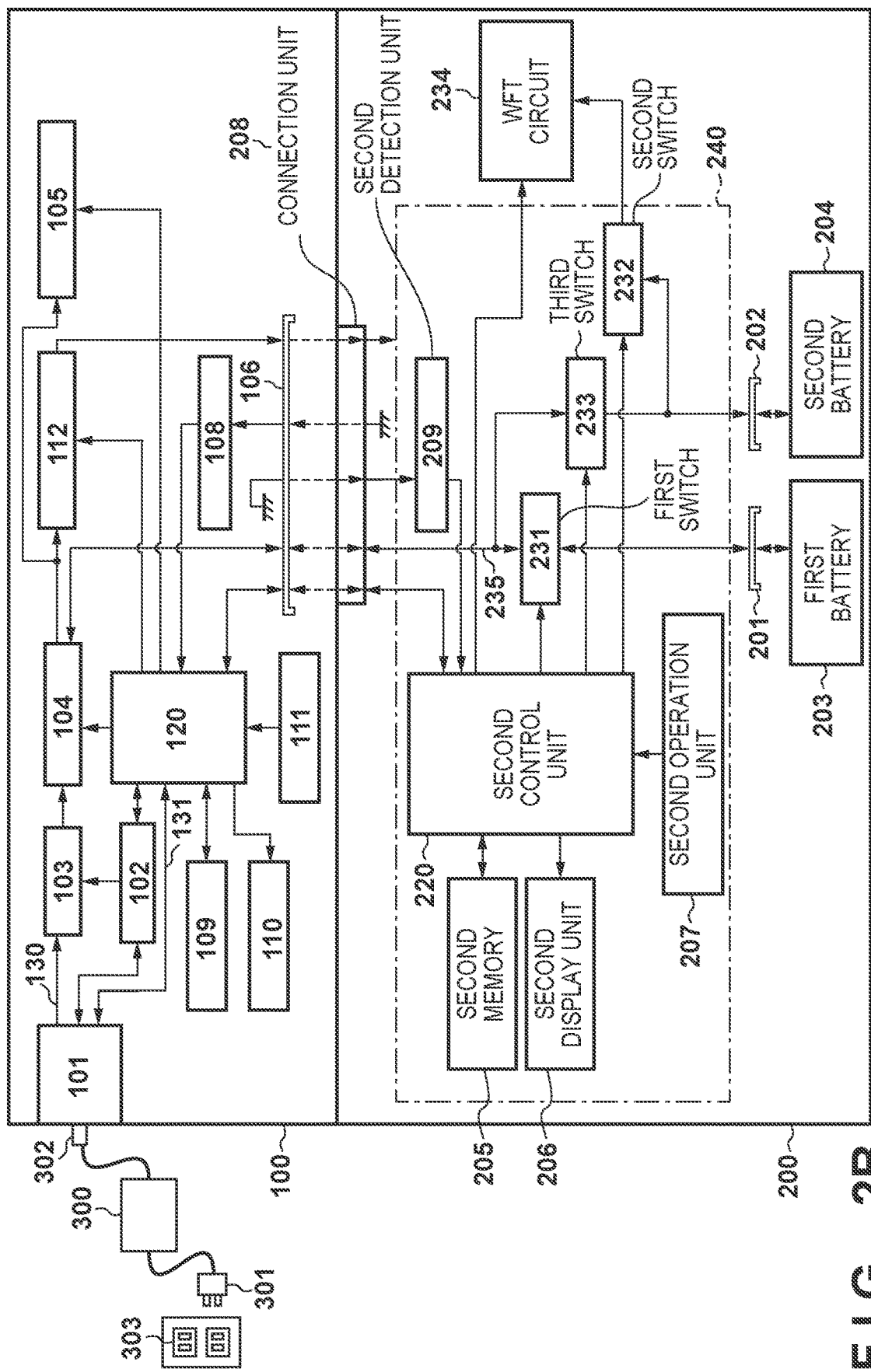
FIG. 2B is a diagram illustrating an example of components of the electronic device 100 and the accessory device 200 according to the first embodiment.

FIG. 2B is a block diagram of the electronic device 100 and the external device 300 when the accessory device 200 is connected to the electronic device 100.

A connection unit 208 is an interface connector capable of connecting the first battery holder 106 of the electronic device 100. In the first embodiment, the connection unit 208 has a shape that fits with the first battery holder 106 of the electronic device 100. Via the connection unit 208, the power supply line from the first battery 203, the power supply line to the first battery 203, or the second battery 204, as well as the communication line, the detection signal line, the power supply line to the system circuit 240 and/or the like are wired.

A second detection circuit 209 is a circuit for detecting that the electronic device 100 is connected to the connection unit 208. A detection signal of the second detection circuit 209 is output to a second control unit 220 which will be described later, and the second control unit 220 can detect that the electronic device 100 is connected. For example, by the terminal of the first battery holder 106 of the electronic device 100 side to be fitted to the connection unit 208 of the accessory device 200 being grounded and the terminal of the accessory device 200 side being pulled up to the power supply or intermittently pulled up to the power supply, the second control unit 220 can detect the connection of the electronic device 100.

Similar to the first memory 109, the second memory 205 includes a nonvolatile memory, a volatile memory, or the like, and is used for storing constants, variables, and computer programs for the operation of the second control unit 220 which will be described later.

Similar to the first display unit 110, the second display unit 206 includes a first light emitting unit 206a and a second light emitting unit 206b for displaying an internal state of the accessory device 200, a charge state of the battery, and/or the like. The first light emitting unit 206a is a light source such as an LED which is turned on while the first battery 203 is being charged, turned off when the charging is completed, or blinked when a charging error occurs. The second light emitting unit 206b is a light source such as LED which is turned on while the second battery 204 is being charged, turned off when the charging is completed, or blinked when a charging error occurs.

Similar to the first operation unit 111, the second operation unit 207 includes switches, dials, or the likes that accepts a user operation such as a shooting instruction, a display of a menu screen display, and a change of a shooting mode.

The second control unit 220 is a microcomputer for controlling various switches, a charge display, or a WFT, or for communicating with the electronic device 100. The second control unit 220 can communicate with the first control unit 120. The second control unit 220, based on an instruction from the first control unit 120, controls a second display unit 206, a first switch 231, a second switch 232, a third switch 233, and a WFT circuit 234. The control of the second display unit 206 is as described above. The control of the first switch 231, the second switch 232, and the third switch 233 will be described later with reference to FIGS. 3A and 3B. When the user sets to use the WFT by the first operation unit 111, based on the instruction from the first control unit 120, the second control unit 220 activates the WFT circuit 234. When the user sets not to use the WFT, based on the instruction from the first control unit 120, the second control unit 220 deactivates the WFT circuit 234.

A second battery holder 201 is a battery housing unit for housing the first battery 203 to be connectable. By connecting the first battery 203 to the second battery holder 201, it is possible to supply power to the electronic device 100 via a first switch 231 which will be described later.

A third battery holder 202 is a battery housing unit for housing the second battery 204 to be connectable. By connecting the second battery 204 to the third battery holder 202, it is possible to supply power to the WFT circuit 234 via the second switch 232 which will be described later.

The first switch 231 is a switch circuit for forming (connecting or disconnecting) a power supply path between the first battery 203 and the electronic device 100. The first switch 231 is turned on when the power supply (charging) is started from the first battery 203 to the electronic device 100 or the power supply is started from the electronic device 100 to the first battery 203, and turned off when the power supply is stopped.

The second switch 232 is a switch circuit for forming (connecting or disconnecting) a power supply path between the second battery 204 and the WFT circuit 234. The second switch 232 is turned on when the power supply is started from the second battery 204 to the WFT circuit 234, and turned off when the power supply is stopped.

The third switch 233 is a switch circuit for forming (connecting or disconnecting) a power supply path between the second battery 204 and the electronic device 100. The third switch 233 is turned on when the power supply is started from the second battery 204 to the electronic device 100 or the power supply (charging) is started from the electronic device 100 to the second battery 204, and turned off when the power supply is stopped.

The WFT (Wireless File Transmitter) circuit 234 is, for example, a functional unit for performing communication with the outside based on a wireless communication standard such as a wireless LAN, and for performing data transfer at high speed.

A power supply path 235 is a common power supply path for supplying power from the first battery 203 to the electronic device 100 or for supplying power supplied from the external device 300 from the electronic device 100 to the first battery 203 or the second battery 204 of the accessory device 200.

A system circuit 240 implements functions of the accessory device 200, except for the WFT circuit 234 and the second power supply circuit 112 of the accessory device 200. The system circuit 240 includes a second memory 205, a second display unit 206, a second operation unit 207, a second detection circuit 209, a second control unit 220, a first switch 231, a second switch 232, and a third switch 233.

Figure 2C:
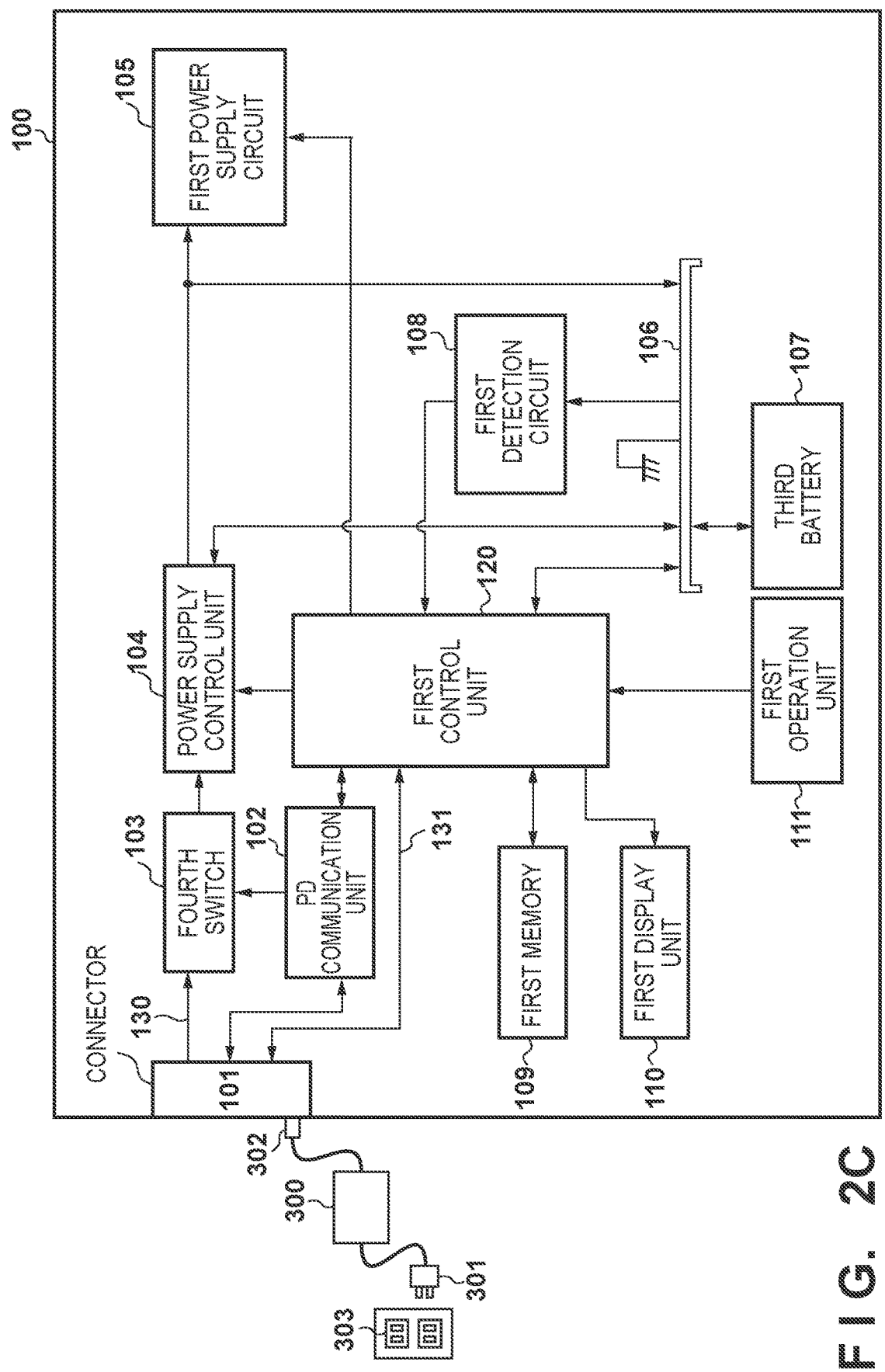
FIG. 2C is a diagram illustrating an example of components of the electronic device 100 and the accessory device 200 according to the first embodiment.
Figure 2D:
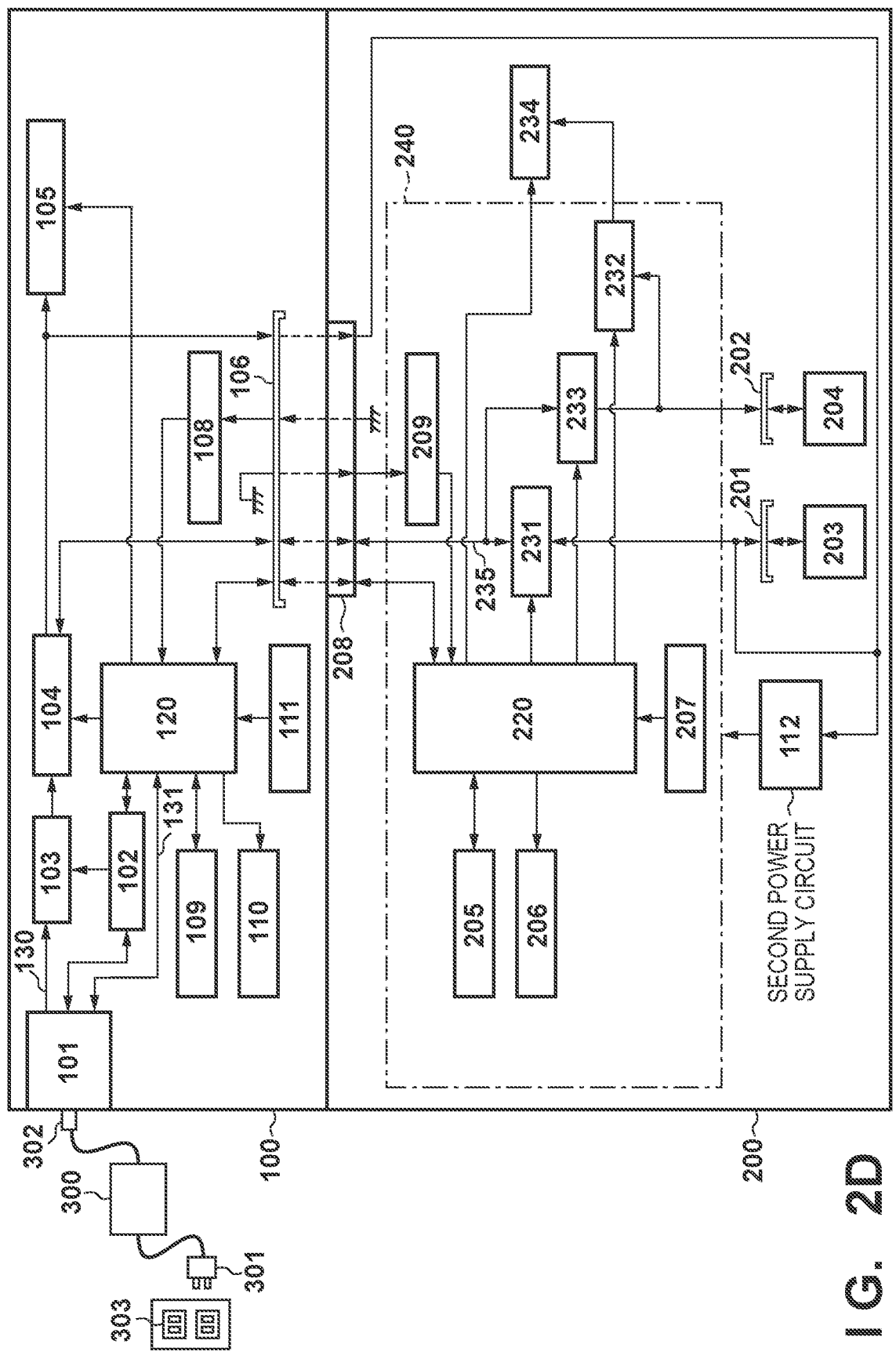
FIG. 2D is a diagram illustrating an example of components of the electronic device 100 and the accessory device 200 according to the first embodiment.

FIGS. 2C and 2D are block diagrams illustrating examples of configurations in which the arrangement of the second power supply circuit 112 is changed with respect to FIGS. 2A and 2B.

The second power supply circuit 112 may be provided in the electronic device 100 or in the accessory device 200.

Hereinafter, a process for controlling charging and/or discharging of batteries 203 and 204 connected to the accessory device 200 via the electronic device 100 in a state where the accessory device 200 is connected to the electronic device 100, will be described with reference to FIGS. 3A to 6.

Figure 3A:
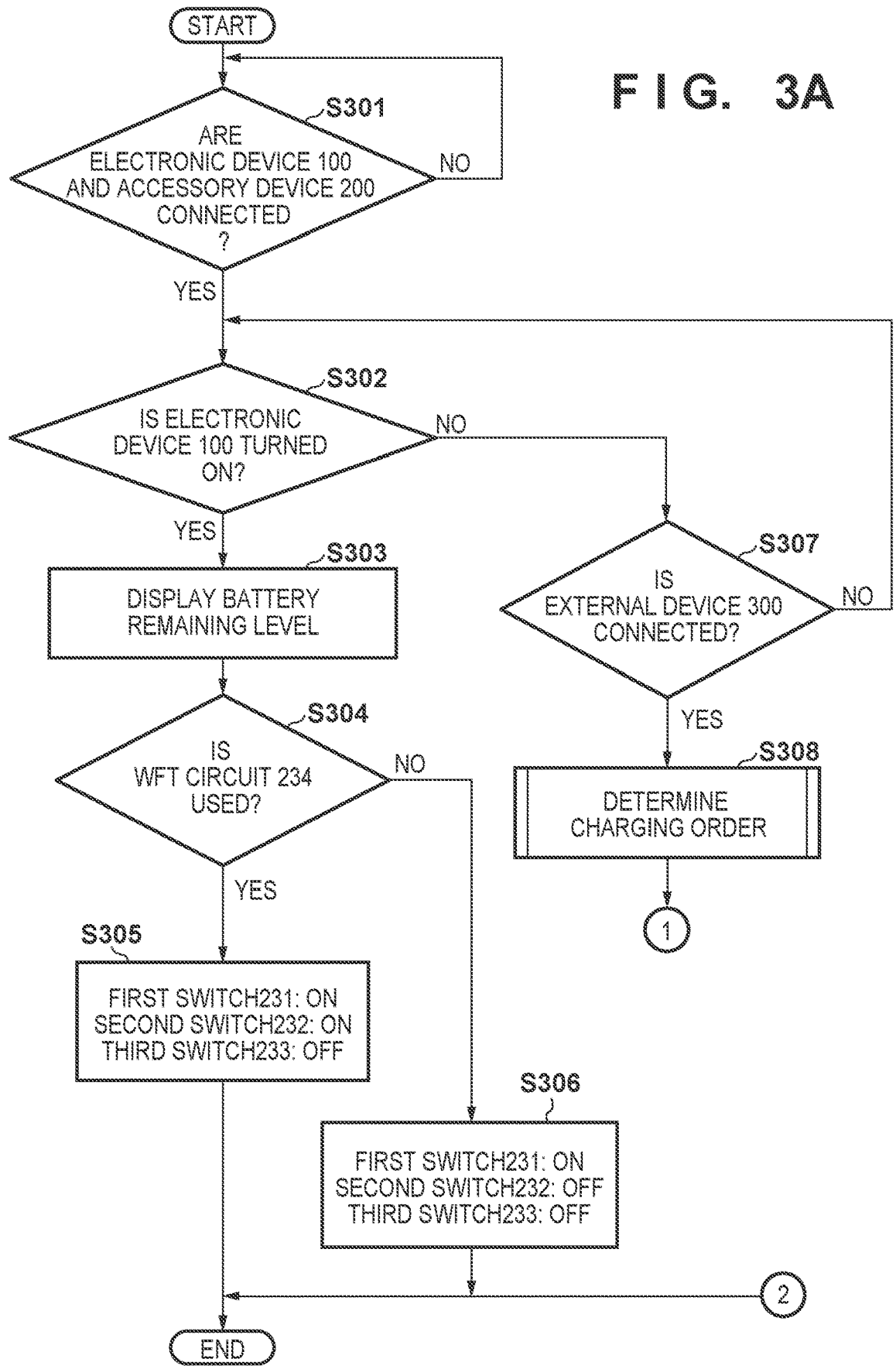

FIGS. 3A and 3B is a flowchart illustrating an example of a process for controlling charging and/or discharging of batteries 203 and 204 connected to the accessory device 200 via the electronic device 100 according to the first embodiment.

The process of FIGS. 3A and 3B is realized by the first control unit 120 of the electronic device 100 executing the program stored in the first memory 109, and the second control unit 220 of the accessory device 200 executing the program stored in the second memory 205. The second control unit 220 performs the process of FIGS. 3A and 3B based on the instruction from the first control unit 120.

In step S301, the first control unit 120 determines whether or not the accessory device 200 is connected to the electronic device 100. When the first control unit 120 determines that the accessory device 200 is connected, the first control unit 120 advances the process of FIGS. 3A and 3B to step S302, and repeats the process of step S301 until the first control unit 120 determines the accessory device 200 is not connected.

In step S302, the first control unit 120 determines whether or not the electronic device 100 is turned on. When the first control unit 120 determines that the power supply of the electronic device 100 is turned on, the first control unit 120 advances the process of FIGS. 3A and 3B to step S303, and when the first control unit 120 determines that the power supply of the electronic device 100 is not turned on, the first control unit 120 advances the process of FIGS. 3A and 3B to step S307.

In step S303, the first control unit 120 displays the battery remaining level of the first battery 203 and the second battery 204 on the first display unit 110, and advances the process of FIGS. 3A and 3B to step S304. The first control unit 120 acquires the battery remaining level of the first battery 203 and the second battery 204 from the second control unit 220 by a communication using a communication line (not shown), and displays the acquired battery remaining levels on the first display unit 110. Details will be described later with reference to FIG. 6.

In step S304, the first control unit 120 determines whether or not the user sets to use the WFT circuit 234 of the accessory device 200 by the first operation unit 111. When the first control unit 120 determines that the user sets to use the WFT circuit 234 of the accessory device 200, the first control unit 120 advances the process of FIGS. 3A and 3B to step S305, when the first control unit 120 determines that the user sets not to use the WFT circuit 234 of the accessory device 200, the first control unit 120 advances the process of FIGS. 3A and 3B to step S306.

In step S305, the second control unit 220 turns on the first switch 231, turns on the second switch 232, and turns off the third switch 233 based on the instruction of the first control unit 120, and the process of FIGS. 3A and 3B ends.

In step S306, the second control unit 220 turns on the first switch 231, turns off the second switch 232, and turns off the third switch 233 based on the instruction of the first control unit 120, and the process of FIGS. 3A and 3B ends.

In step S307, the first control unit 120 determines whether or not the external device 300 is connected. When the first control unit 120 determines that the external device 300 is connected, the first control unit 120 advances the process of FIGS. 3A and 3B to step S308, when the first control unit 120 determines that the external device 300 is not connected, the first control unit 120 returns the process to step S302.

In step S308, the first control unit 120, based on the power amount that can be supplied from the external device 300, determines the charging order of the first battery 203 and the second battery 204, and advances the process of FIGS. 3A and 3B to step S309. A method of determining the charging order will be described later with reference to FIGS. 4 and 5.

In step S309, the first control unit 120 determines whether or not the charging of the first battery 203 is prioritized. When the first control unit 120 determines that the charging of the first battery 203 is prioritized, the first control unit 120 advances the process of FIGS. 3A and 3B to step S310, and when the first control unit 120 determines that the charging of the first battery 203 is not prioritized, the first control unit 120 advances the process of FIGS. 3A and 3B to step S315.

In step S310, the second control unit 220 turns on the first switch 231, turns off the second switch 232, and turns off the third switch 233 based on an instruction from the first control unit 120, and advances the process of FIGS. 3A and 3B to step S311.

In step S311, the second control unit 220, based on the instruction of the first control unit 120, starts charging the first battery 203, and advances the process of FIGS. 3A and 3B to step S312.

In step S312, the first control unit 120 determines whether or not the charging of the first battery 203 is completed.

When the first control unit 120 determines that the charging of the first battery 203 is completed, the first control unit 120 advances the process of FIGS. 3A and 3B to step S313, and repeats the process of step S312 until the charging of the first battery 203 is completed.

In step S313, the first control unit 120 terminates the charging of the first battery 203, and advances the process of FIGS. 3A and 3B to step S314.

In step S314, the first control unit 120 determines whether or not the charging of the second battery 204 is completed. When the first control unit 120 determines that the charging of the second battery 204 is completed, the first control unit 120 ends the process of FIGS. 3A and 3B, and when the first control unit 120 determines that the charging of the second battery 204 is not completed, the first control unit 120 advances the process of FIGS. 3A and 3B to step S315.

In step S315, the second control unit 220 turns off the first switch 231, turns off the second switch 232, and turns on the third switch 233 based on the instruction from the first control unit 120, and advances the process of FIGS. 3A and 3B to step S316.

In step S316, the first control unit 120 starts charging the second battery 204, and advances process of FIGS. 3A and 3B proceeds to step S317.

In step S317, the first control unit 120 determines whether or not the charging of the second battery 204 is completed. When the first control unit 120 determines that the charging of the second battery 204 is completed, the first control unit 120 advances the process of FIGS. 3A and 3B to step S318, and repeats the process of step S317 until the charging of the second battery 204 is completed.

In step S318, the first control unit 120 terminates the charging of the second battery 204, and advances the process of FIGS. 3A and 3B to step S319.

In step S319, the first control unit 120 determines whether or not the charging of the first battery 203 is completed. When the first control unit 120 determines that the charging of the first battery 203 is completed, the first control unit 120 ends the process of FIGS. 3A and 3B, and when the first control unit 120 determines that the charging of the first battery 203 is not completed, the first control unit 120 advances the process of FIGS. 3A and 3B to step S310.

FIG. 4 is a flowchart illustrating an example of a charging order determination process in step S308 of FIG. 3A. Hereinafter, it will be described as assumed that the first battery 203 is a battery for supplying power to the electronic device 100, the second battery 204 is a battery for supplying power to the accessory device 200.

In step S401, the first control unit 120 determines whether or not the charging order of the batteries is set to "PRIORITY TO BATTERY FOR ELECTRONIC DEVICE" by the user operation. When the first control unit 120 determines that the charging order of the batteries is set to "PRIORITY TO BATTERY FOR ELECTRONIC DEVICE", the first control unit 120 advances the process of FIG. 4 to step S402, and when the first control unit 120 determines that the charging order of the batteries is not set to "PRIORITY TO BATTERY FOR ELECTRONIC DEVICE", the first control unit 120 advances the process of FIG. 4 to step S403.

In step S402, the first control unit 120 sets the charging order of the batteries to prioritize the first battery 203 for the electronic device, and ends the process of FIG. 4.

In step S403, the first control unit 120 determines whether or not the charging order of the batteries is set to "PRIORITY TO BATTERY FOR ACCESSORY DEVICE" by the user operation. When the first control unit 120 determines that the charging order of the batteries is set to "PRIORITY TO BATTERY FOR ACCESSORY DEVICE", the first control unit 120 advances the process of FIG. 4 to step S404, and when the first control unit 120 determines that the charging order of the batteries is not set to "PRIORITY TO BATTERY FOR ACCESSORY DEVICE", the first control unit 120 advances the process of FIG. 4 to step S405.

In step S404, the first control unit 120 sets the charging order of the batteries to prioritize the second battery 204 for the accessory device, and ends the process of FIG. 4.

In step S405, the first control unit 120 determines that the charging order of the batteries is set to "PRIORITY TO BATTERY WITH SMALLER REMAINING LEVEL" by the user operation, and advances the process of FIG. 4 to step S406.

In step S406, the first control unit 120 determines whether or not the remaining level of the first battery 203 for the electronic device is less than the remaining level of the second battery 204 for the accessory device. When the first control unit 120 determines that the remaining level of the first battery 203 for the electronic device is smaller than the remaining level of the second battery 204 for the accessory device, the first control unit 120 advances the process of FIG. 4 to step S402. When the first control unit 120 determines that the remaining level of the first battery 203 for the electronic device is not smaller than the remaining level of the second battery 204 for the accessory device, the first control unit 120 advances the process of FIG. 4 to step S404.

FIG. 5 is a diagram illustrating an example of a charging order setting screen of the battery according to the first embodiment.

A first display screen 500 is a menu screen for setting the charging order of the batteries, which is displayed on the first display unit 110. A first selection item 501 is a selection item for setting the charging order of the battery to "PRIORITY TO BATTERY FOR ELECTRONIC DEVICE", and is a setting that in which the charging of the battery for the electronic device is prioritized. A second selection item 502 is a selection item for setting the charging order of the batteries to "PRIORITY TO BATTERY FOR ACCESSORY DEVICE", and is a setting in which the charging of the battery for the accessory device is prioritized. A third selection item 503 is a selection item for setting the charging order of the batteries to "PRIORITY TO BATTERY WITH SMALLER REMAINING LEVEL", and is a setting in which the remaining level of the battery for the electronic device and the remaining level of the battery for the accessory device is compared and the charging of the battery with SMALLER remaining level is prioritized.

FIGS. 5A, 5B, and 5C are examples of displaying states where the first selection item 501, the second selection item 502 and the third selection item 503 are set in the first display screen 500. FIG. 5A is a display example illustrating a state where "PRIORITY TO BATTERY FOR ELECTRONIC DEVICE" is set. FIG. 5B is a display example illustrating a state where "PRIORITY TO BATTERY FOR ACCESSORY DEVICE" is prioritized. FIG. 5C is a display example illustrating a state set to "PRIORITY TO BATTERY WITH SMALLER REMAINING LEVEL".

Figure 6:
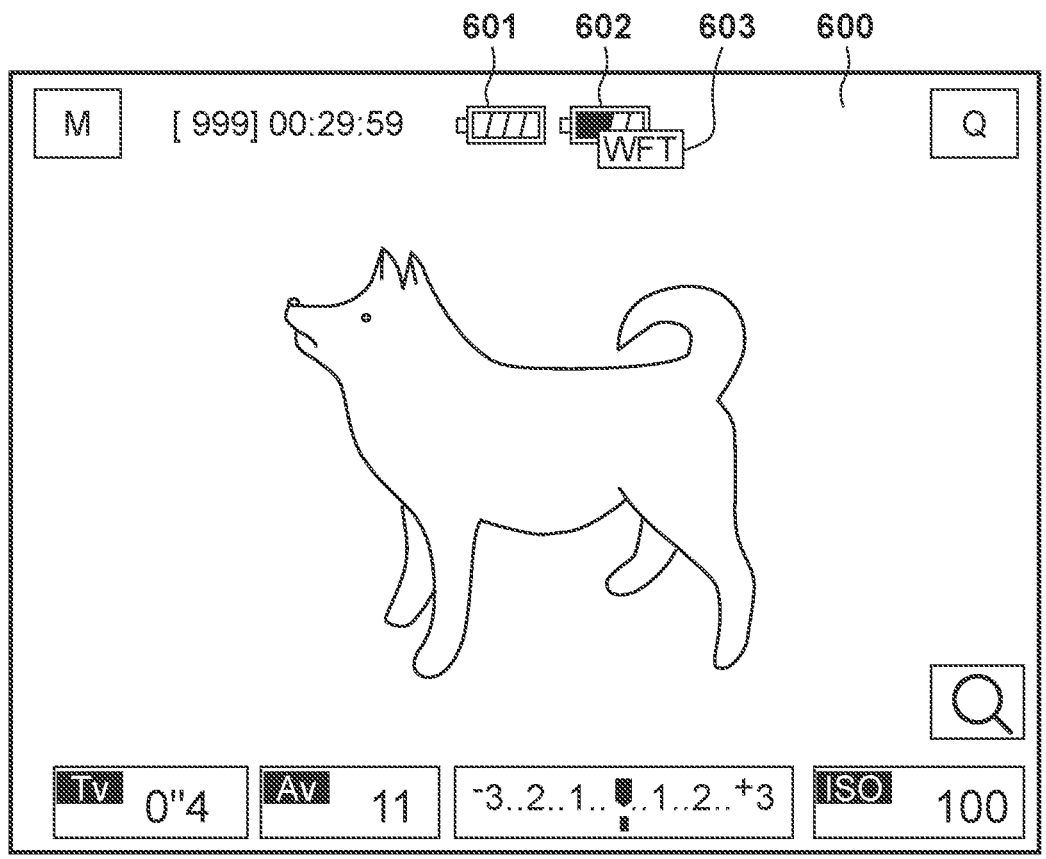
FIG. 6 is a diagram illustrating an example of displaying remaining levels of the batteries 203 and 204 according to the first embodiment.

FIG. 6 is a diagram illustrating a display example of a battery remaining level according to the first embodiment.

A second display screen 600 is a live view screen displayed on the first display unit 110 in the shooting mode of the electronic device 100. In the second display screen 600, various setting values such as an object, a shutter speed and an aperture of the electronic device 100 are displayed. A first icon 601 is a display of the remaining level of the battery for the electronic device. A second icon 602 is a display of the remaining level of the battery for the accessory device. Information 603 is part of the second icon 602, and is, for example, a mark indicating a power supply destination of the battery for the accessory device.

According to the first embodiment, the charging and/or discharging of the batteries 203 and 204 of the accessory device 200 to the power supply control unit 104 of the electronic device 100 can be performed via a common power supply path 235. Thus, the charging and/or discharging of the batteries 203 and 204 of the accessory device 200 can be controlled without increasing the circuit scale for performing power supply between the electronic device 100 and the accessory device 200. Furthermore, the charging order of the batteries 203 and 204 can be set by the user operation, and the charging of the battery which the user desires to prioritize can be performed.

Second Embodiment

Next, the second embodiment will be described with reference to FIGS. 7A to 7C.

In the second embodiment, an example of gradually controlling the charging and/or discharging of the batteries 203 and 204 connected to the accessory device 200 via the electronic device 100, will be described.

Figure 7A:
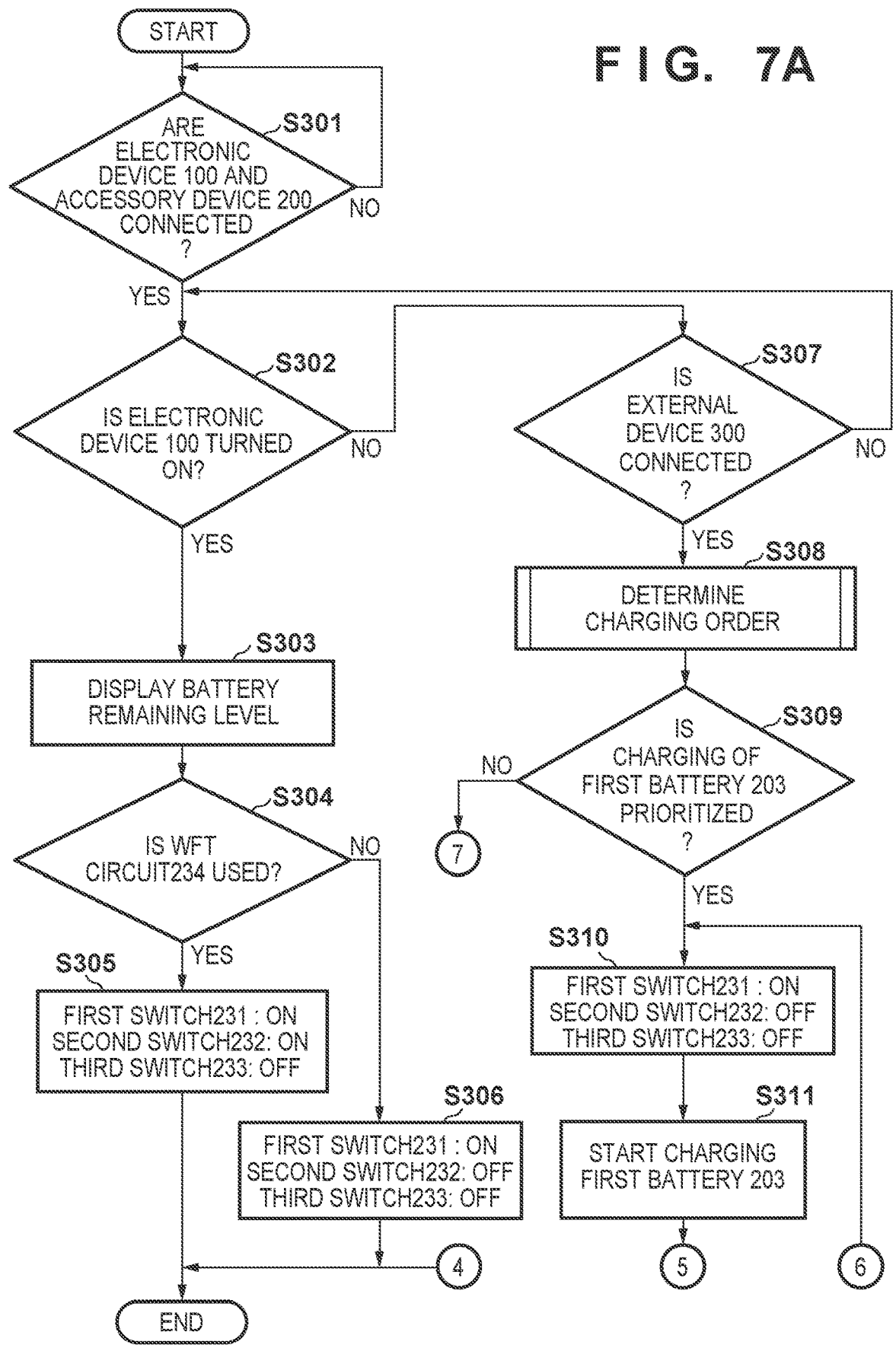
FIGS. 7A to 7C are flowcharts illustrating an example of a process for controlling charging and/or discharging of the batteries 203 and 204 connected to the accessory device 200 via the electronic device 100 according to the second embodiment.
Figure 7B:
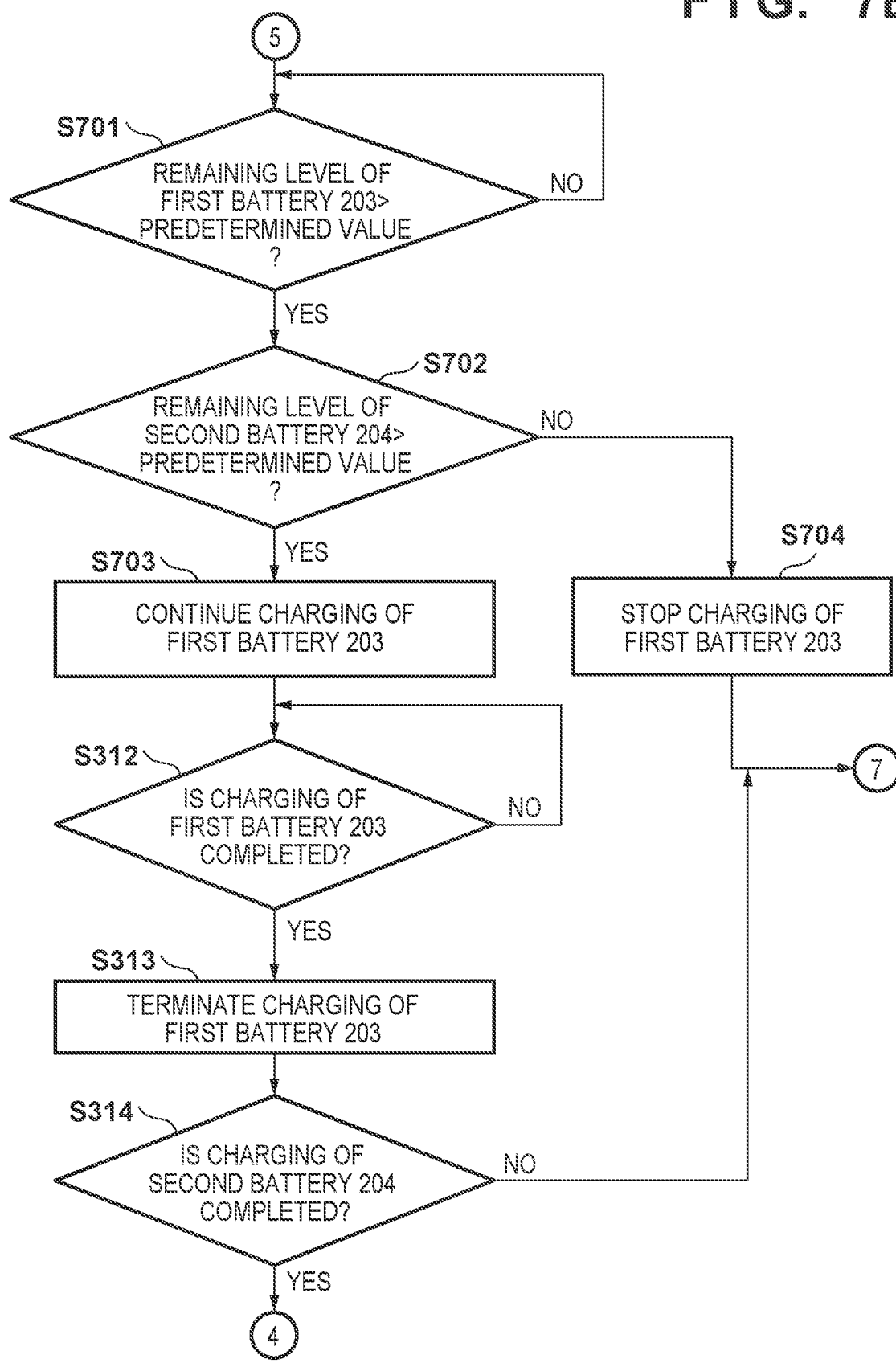
Figure 7C:
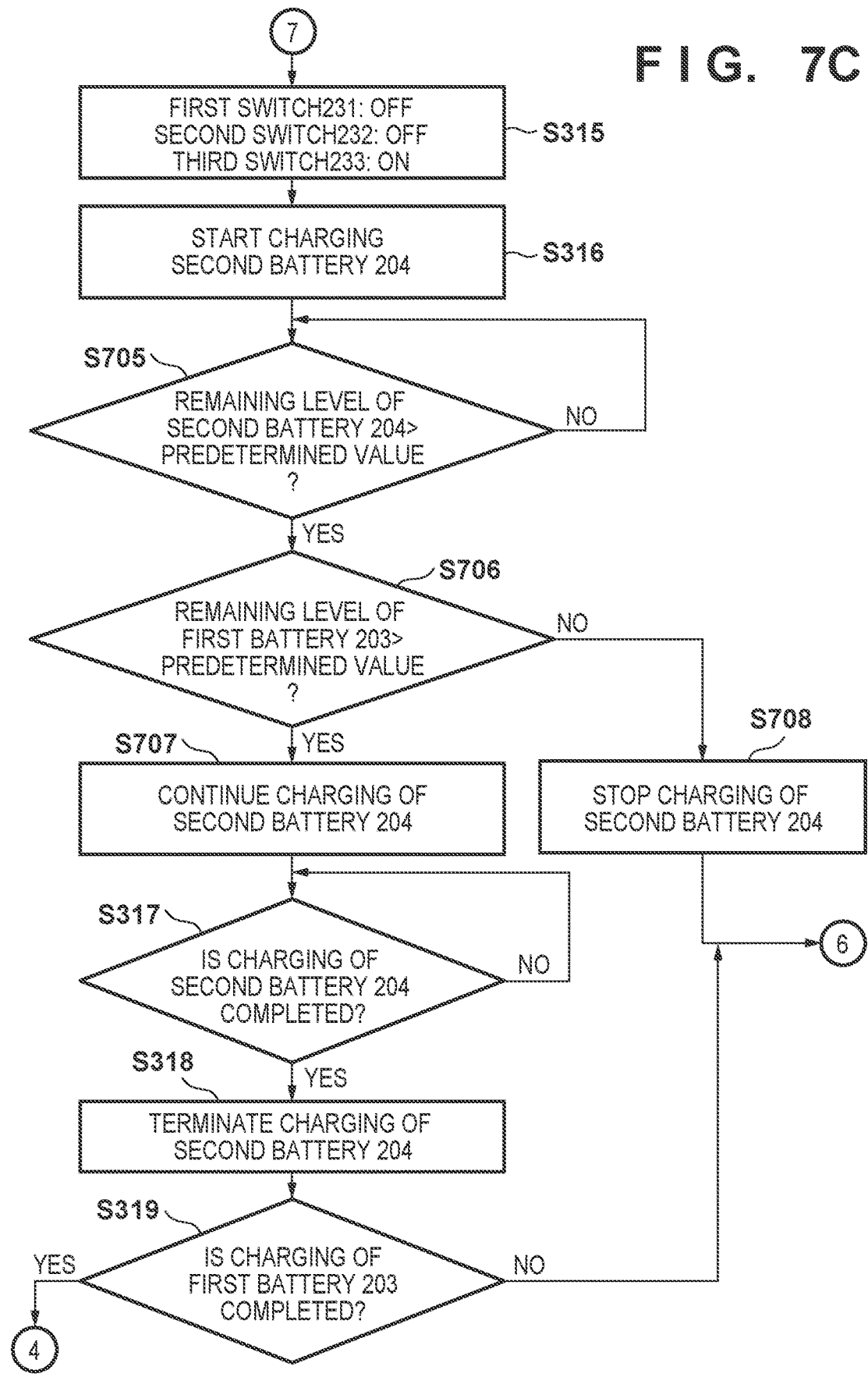

FIGS. 7A to 7C are flowcharts illustrating an example of a process for controlling the charging and/or discharging of the batteries 203 and 204 connected to the accessory device 200 via the electronic device 100 in the second embodiment.

The process of FIGS. 7A to 7C is realized by the first control unit 120 of the electronic device 100 executing the program stored in the first memory 109, and the second control unit 220 of the accessory device 200 executing the program stored in the second memory 205. The second control unit 220 performs the process of FIGS. 7A to 7C based on the instruction from the first control unit 120.

In the flowchart of FIGS. 7A to 7C, the same steps as those of the flowchart of FIGS. 3A and 3B are denoted by the same step numbers, and duplicate descriptions are omitted.

Furthermore, the configurations of the electronic device 100 and the accessory device 200 of the second embodiment is the same as the configurations of FIGS. 1 and 2A to 2D described according to the first embodiment.

In step S701, the first control unit 120 determines whether or not the remaining level of the first battery 203 is larger than a predetermined value 50%. When the first control unit 120 determines that the remaining level of the first battery 203 is larger than the predetermined value 50%, the first control unit 120 advances the process of FIGS. 7A to 7C to step S702, and when the first control unit 120 determines the remaining level of the first battery 203 is equal to or less than the predetermined value 50%, the first control unit 120 repeats the process of step S702.

In step S702, the first control unit 120 determines whether or not the remaining level of the second battery 204 is larger than the predetermined value 50%. When the first control unit 120 determines that the remaining level of the second battery 204 is larger than the predetermined value 50%, the first control unit 120 advances the process of FIGS. 7A to 7C to step S703, and when the first control unit 120 determines the remaining level of the second battery 204 is equal to or less than the predetermined value 50%, the first control unit 120 advances the process of FIGS. 7A to 7C to step S704.

In step S703, the first control unit 120 continues to charge the first battery 203, and advances the process of FIGS. 7A to 7C to step S312.

In step S704, the first control unit 120 stops charging the first battery 203, and advances the process of FIGS. 7A to 7C to step S315.

In step S705, the first control unit 120 determines whether or not the remaining level of the second battery 204 is larger than a predetermined value 50%. When the first control unit 120 determines that the remaining level of the second battery 204 is larger than the predetermined value 50%, the first control unit 120 advances the process of FIGS. 7A to 7C to step S706, and when the first control unit 120 determines that the remaining level of the second battery 204 is equal to or less than the predetermined value 50%, the first control unit 120 repeats the process of step S705.

In step S706, the first control unit 120 determines whether or not the remaining level of the first battery 203 is larger than a predetermined value 50%. When the first control unit 120 determines that the remaining level of the first battery 203 is larger than the predetermined value 50%, the first control unit 120 advances the process of FIGS. 7A to 7C to step S707, and when the first control unit 120 determines that the remaining level of the first battery 203 is equal to or less than the predetermined value 50%, the first control unit 120 advances the process of FIGS. 7A to 7C to step S708.

In step S707, the first control unit 120 continues to charge the second battery 204, and advances the process of FIGS. 7A to 7C to step S317.

In step S708, the first control unit 120 stops charging the second battery 204, and advances the process of FIGS. 7A to 7C to step S310.

According to the second embodiment, in addition to the effect of the first embodiment, the convenience is improved by charging the batteries 203 and 204 to a usable level in a short time, even if the externally supplied power is not sufficient to fully charge the batteries 203 and 204 of the accessory device 200.

Third Embodiment

Next, the third embodiment will be described with reference to FIGS. 8A to 8C.

In the third embodiment, an example of controlling the charging and/or discharging of the batteries 203 and 204 connected to the accessory device 200 via the electronic device 100 based on the battery remaining level of the external device 300 for supplying power to the electronic device 100, will be described.

Figure 8A:
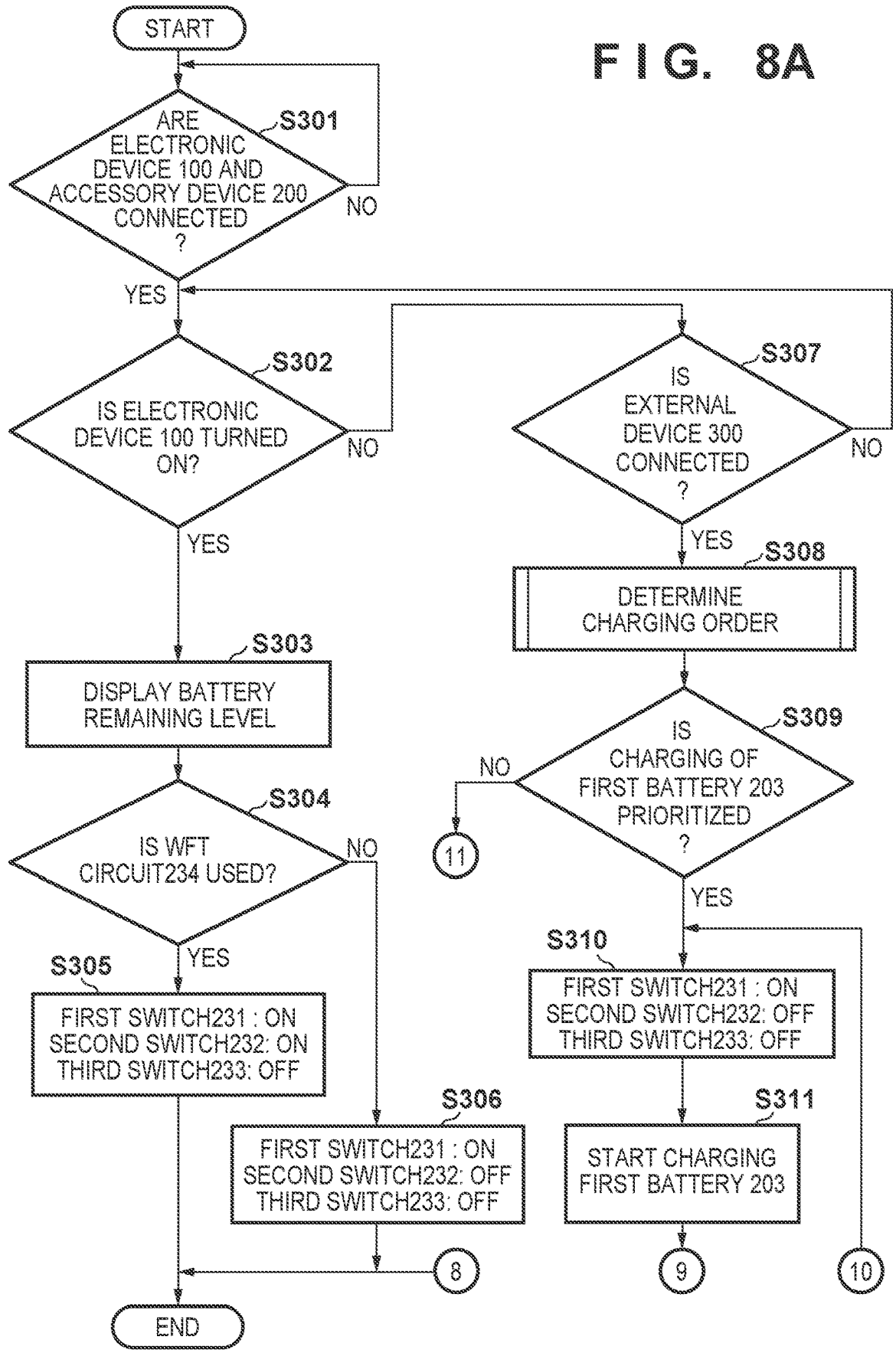
FIGS. 8A to 8C are flowcharts illustrating an example of a process for controlling charging and/or discharging of the batteries 203 and 204 connected to the accessory device 200 via the electronic device 100 according to the third embodiment.
Figure 8B:
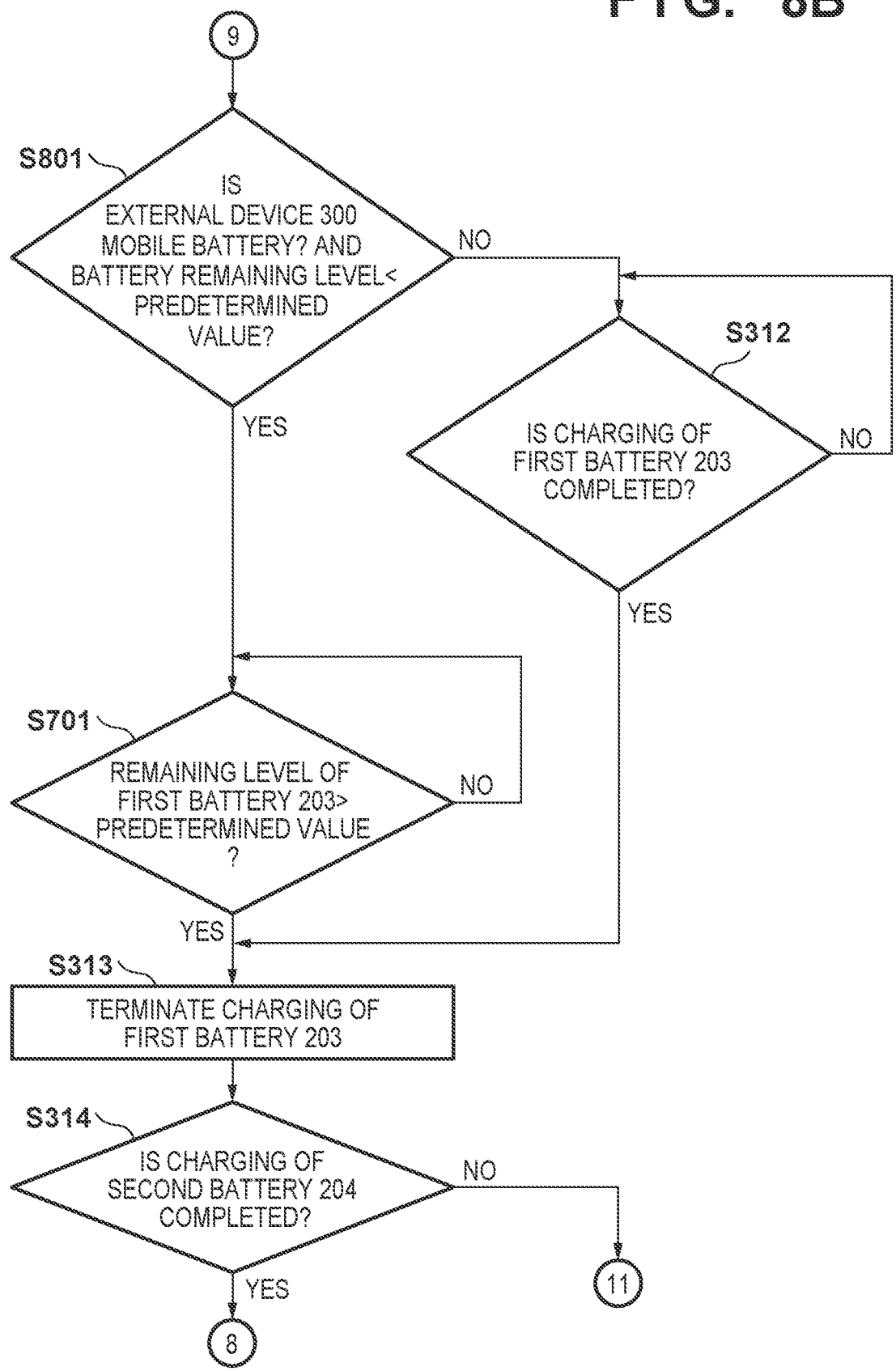
Figure 8C:
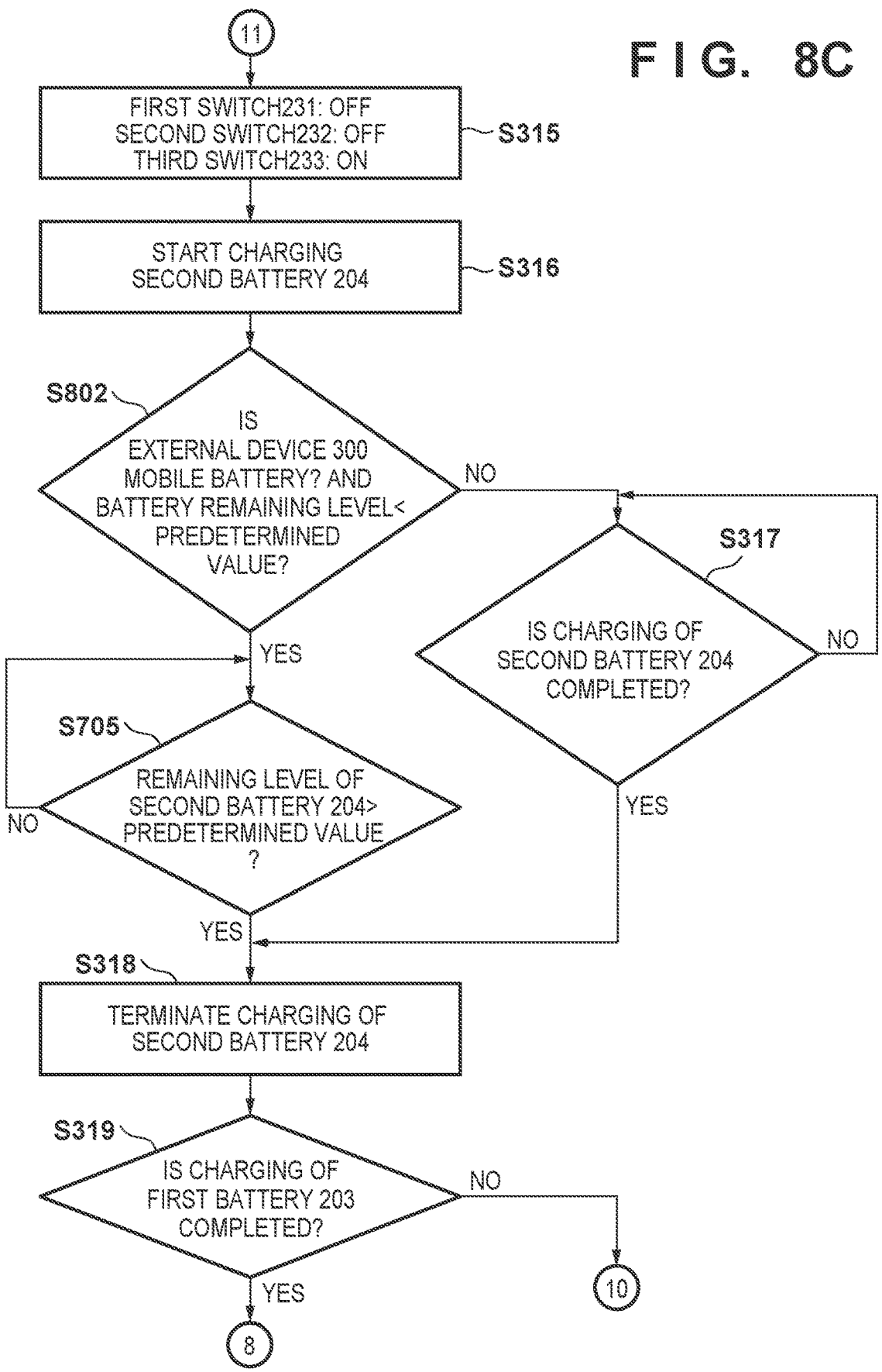

FIGS. 8A to 8C are flowcharts illustrating an example of a process for controlling the charging and/or discharging of the batteries 203 and 204 connected to the accessory device 200 via the electronic device 100 in the third embodiment.

The process of FIGS. 8A to 8C is realized by the first control unit 120 of the electronic device 100 executing the program stored in the first memory 109, and the second control unit 220 of the accessory device 200 executing the program stored in the second memory 205. The second control unit 220 performs the process of FIGS. 8A to 8C based on the instruction from the first control unit 120.

In the flowchart of FIGS. 8A to 8C, the same steps as those of the flowcharts of FIGS. 3A, 3B and 7A to 7C are denoted by the same step numbers, and duplicate descriptions are omitted.

In step S801, the first control unit 120 determines whether or not the external device 300 connected to the electronic device 100 is a mobile battery that is a device having a finite power source and whether or not the battery remaining level is less than a predetermined value 50%. When the first control unit 120 determines that the external device 300 is the mobile battery and that the battery remaining level is less than the predetermined value 50%, the first control unit 120 advances the process of FIGS. 8A to 8C to step S701. Furthermore, when the first control unit 120 determines that the external device 300 is not the mobile battery, or that the battery remaining level is larger than the predetermined value 50%, the first control unit 120 advances the process of FIGS. 8A to 8C to step S312.

In step S802, the first control unit 120 determines whether or not the external device 300 is the mobile battery that is the device having the finite power source and whether or not the battery remaining level is less than the predetermined value 50%. When the first control unit 120 determines that the external device 300 is the mobile battery and that the battery remaining level is less than the predetermined value 50%, the first control unit 120 advances the process of FIGS. 8A to 8C to step S705. Furthermore, when the first control unit 120 determines that the external device 300 is not the mobile battery, or that the battery remaining level is larger than the predetermined value 50%, the first control unit 120 advances the process of FIGS. 8A to 8C to step S317.

According to the third embodiment, in addition to the effect of the first embodiment, the charging of the batteries 203 and 204 of the accessory device 200 can be efficiently performed based on the remaining level of the mobile battery which is the external device 300 connected to the electronic device 100.

In the first to third embodiments described above, when the charging of the second battery 204 is performed, although the second switch 232 is turned off to stop the power supply from the second battery 204 to the WFT circuit 234, it may be controlled that the charging of the second battery 204 is not performed, the second switch 232 is turned on when performing the charging of the first battery 203 to perform power supply from the second battery 204 to the WFT circuit 234.

Furthermore, the third embodiment can be applied to any electronic device as long as it has a function of controlling charging and/or discharging of batteries of other electronic devices. In each embodiment described above, an example in which the power, data and signal are transmitted and received by the connection unit 208 via the power supply line, the communication line and the detection signal line has been described, the connection unit 208 may be one or more. In addition, one of the first detection circuit 108 and the second detection circuit 209 may be used for detecting a connection between the electronic device 100 and the accessory device 200. The display of the charge state by the first light emitting unit 206a and the second light emitting unit 206b may be a display appearance other than that in the embodiment described above. In the first display screen 500, three selection items are exemplified with respect to the charging order of the batteries, but there may be other selection items. For example, "PRIORITY TO BATTERY FOR CAMERA (GRADUALLY CHARGING)" may be provided with a selection item for performing the control of the second embodiment. Furthermore, the number of selection items relating to the charging order of the batteries may be less than the examples of FIG. 5. For example, the number of the selection items of the charging orders may be even two of "PRIORITY TO BATTERY FOR ELECTRONIC DEVICE" and "PRIORITY TO BATTERY FOR ACCESSORY DEVICE". Furthermore, in FIGS. 7A to 7C, the threshold of the remaining level of the mobile battery is set to 50%, but a value other than 50% may be set, and thresholds may be provided.

Fourth Embodiment

At least one of the various functions, process, and methods described in the embodiments described above may be realized using a program. Hereinafter, in the fourth embodiment, a program for realizing at least one of the various functions, processes, and methods described in the above-described embodiments is referred to as "program X". Furthermore, in the fourth embodiment, a computer for executing the program X is referred to as a "computer Y." Personal computers, microcomputers, CPUs (Central process Unit), or the like are exemplary computers Y. At least one of the various functions, processes, and methods described in the above embodiments may be implemented by the computer Y executing the program X. In this case, the program X is supplied to the computer Y via a computer-readable storage medium. The computer-readable storage medium according to the fourth embodiment includes at least one of a hard disk drive, a magnetic storage device, an optical storage device, a magnetic optical storage device, a memory card, a ROM, a RAM, or the like. Furthermore, the computer-readable storage medium of the fourth embodiment is a non-transitory (non-temporary) storage medium.

While aspects of the disclosure are described with reference to exemplary embodiments, it is to be understood that the aspects of the disclosure are not limited to the exemplary embodiments. The scope of the following claims is to be accorded the broadest interpretation so as to encompass all modifications and equivalent structures.

This application claims the benefit of Japanese Patent Application No. 2020-080692, filed Apr. 30, 2020, which is hereby incorporated by reference herein in its entirety.

What is claimed is:

1. An electronic device comprising:
    a connection circuitry to which an external device is connected; and
    a CPU that executes a program stored in a memory to function as:
    a control unit that (a) enables a power supply path for supplying power from a first battery connected to the external device to the electronic device and enables a power supply path for supplying power from a second battery connected to the external device to a predetermined functional unit of the external device, in a case where one of the first battery and the second battery connected to the external device is not charged, and (b) disables a power supply path for supplying power from the second battery connected to the external device to the predetermined functional unit and enables a power supply path for supplying power from the electronic device to the one of the first battery and the second battery, in a case where the one of the first battery rand the second battery connected to the external device is charged.

2. The electronic device according to claim 1, wherein the control unit controls a first switch for enabling a power supply path between the first battery and the electronic device, a second switch for enabling a power supply path between the second battery, and the predetermined functional unit, and a third switch for enabling a power supply path between the second battery and the electronic device,
    wherein the control unit controls the first switch to supply power from the first battery to the electronic device and controls the second switch to supply power from the second battery to the predetermined functional unit, in a case where the one of the first battery and the second battery connected to the external device is not charged, and wherein the control unit controls the second switch to stop supplying power from the second battery to the predetermined functional unit and controls the first switch and the third switch to supply power to the one of the first battery and the second battery, in a case where the one of the first battery and the second battery connected to the external device is charged.

3. The electronic device according to claim 2, wherein the control unit controls the second switch to enable the power supply path for supplying power from the second battery to the predetermined functional unit, in a case where the electronic device is turned on and the predetermined functional unit is activated, and wherein the control unit controls the second switch to disable the power supply path for supplying power from the second battery to the predetermined functional unit, in a case where the predetermined functional unit is not activated.

4. The electronic device according to claim 1, wherein the control unit performs control to charge the first battery or the second battery with power supplied from a power supply device connected to the electronic device, and wherein the control unit determines a charging order of the first battery and the second battery, in a case where the first battery and the second battery connected to the external device is charged.

5. The electronic device according to claim 4, wherein the control unit determines the charging order of the first battery and the second battery based on a user setting.

6. The electronic device according to claim 4, wherein the control unit performs control to charge the first battery before the second battery in a case where a remaining level of the first battery is smaller than a remaining level of the second battery, and control to charge the second battery before the first battery in a case where the remaining level of the second battery is smaller than the remaining level of the first battery.

7. The electronic device according to claim 1, further comprising a display, wherein the control unit controls the display to displays a remaining level of the first battery or the second battery and information indicating a power supply destination of the first battery or the second battery.

8. The electronic device according to claim 1, wherein the electronic device is capable of acting as an image capture apparatus.

9. The electronic device according to claim 1, wherein the predetermined functional unit has a function of performing a wireless communication.

10. The electronic device according to claim 1, wherein the control unit (a) enables the power supply path for supplying power from the first battery connected to the external device to the electronic device and enables the power supply path for supplying power from the second battery connected to the external device to the predetermined functional unit, in a case where the second battery connected to the external device is not charged, and (b) disables the power supply path for supplying power from the second battery connected to the external device to the predetermined functional unit and enables the power supply path for supplying power from the second battery connected to the external device to the electronic device, in a case where the second battery connected to the external device is charged.

11. The electronic device according to claim 1, wherein the control unit performs control to charge the first battery and the second battery with power supplied from a power supply device connected to the electronic device, wherein the control unit performs control to charge the one of the first battery and the second battery before another of the first battery and the second battery and to charge the another of the first battery and the second battery in accordance with a completion of charging the one of the first battery and the second battery, and wherein the control unit disables the power supply path for supplying power from the second battery to the predetermined functional unit and enables a power supply path for supplying power from the electronic device to the another of the second battery or the second battery, in a case where the another of the first battery and the second battery is charged.

12. A method comprising:

enabling a power supply path for supplying power from a first battery connected to an external device to an electronic device and enabling a power supply path for supplying power from a second battery connected to the external device to a predetermined functional unit of the external device, in a case where one of the first battery and the second battery connected to the external device is not charged; and disabling a power supply path for supplying power from the second battery connected to the external device to the predetermined functional unit and enabling a power supply path for supplying power from the electronic device to the one of the first battery and the second battery, in a case where the one of the first battery and the second battery connected to the external device is charged.

13. The method according to claim 12, further comprising:

causing a display unit of the electronic device to display a remaining level of the first battery or the second battery; and information indicating a power supply destination of the first battery or the second battery.

14. The method according to claim 12, wherein the electronic device is capable of acting as an image capture apparatus.

15. The method according to claim 12, wherein the predetermined functional unit has a function of performing a wireless communication.

16. The method according to claim 12, further comprising:

enabling the power supply path for supplying power from the first battery connected to the external device to the electronic device and enabling the power supply path for supplying power from the second battery connected to the external device to the predetermined functional unit, in a case where the second battery connected to the external device is not charged; and disabling the power supply path for supplying power from the second battery connected to the external device to the predetermined functional unit and enabling the power supply path for supplying power from the second battery connected to the external device to the electronic device, in a case where the second battery connected to the external device is charged.

17. A non-transitory storage medium storing a program for causing a computer to execute a method, the method comprising:
enabling a power supply path for supplying power from a first battery connected to an external device to an electronic device and enabling a power supply path for supplying power from a second battery connected to the external device to a predetermined functional unit of the external device, in a case where one of the first battery and the second battery connected to the external device is not charged; and
disabling a power supply path for supplying power from the second battery connected to the external device to the predetermined functional unit and enabling a power supply path for supplying power from the electronic device to the one of the first battery and the second battery, in a case where the one of the first battery and the second battery connected to the external device is charged.

* * * * *